(12) United States Patent
Lewis et al.

(10) Patent No.: US 7,379,519 B2
(45) Date of Patent: *May 27, 2008

(54) PREAMBLE AIDED SYNCHRONIZATION

(75) Inventors: Michael Lewis, Hartville, OH (US); David M. Theobold, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/300,934

(22) Filed: Dec. 15, 2005

(65) Prior Publication Data

US 2006/0093078 A1   May 4, 2006

Related U.S. Application Data

(63) Continuation of application No. 10/039,117, filed on Nov. 20, 2001, now Pat. No. 7,006,587.

(51) Int. Cl.
*H04L 7/00* (2006.01)

(52) U.S. Cl. ...................................... 375/365

(58) Field of Classification Search ............... 375/365, 375/324, 326, 260, 354, 342, 366, 510, 520, 375/352, 325, 345
See application file for complete search history.

(56) References Cited

U.S. PATENT DOCUMENTS

| | | | | |
|---|---|---|---|---|
| 5,465,271 A * | 11/1995 | Hladik et al. | ............... | 375/267 |
| 5,625,651 A | 4/1997 | Cioffi | ............ | 375/354 |
| 5,732,113 A | 3/1998 | Schmidl et al. | ............. | 375/354 |
| 5,909,470 A | 6/1999 | Barratt et al. | ............... | 375/324 |
| 5,909,471 A | 6/1999 | Yun | ............ | 375/343 |
| 6,208,695 B1 | 3/2001 | Klank et al. | ................ | 375/260 |
| 6,252,908 B1 | 6/2001 | Tore | ............ | 375/259 |
| 6,275,543 B1 | 8/2001 | Petrus et al. | ................ | 375/324 |
| 6,285,654 B1 | 9/2001 | Marchok et al. | ............ | 370/208 |
| 6,381,251 B1 | 4/2002 | Sano et al. | ............... | 370/480 |
| 6,483,885 B1 * | 11/2002 | Bradley et al. | ............. | 375/366 |
| 6,549,564 B1 | 4/2003 | Popovic | ...................... | 375/142 |
| 6,567,482 B1 | 5/2003 | Popovic | ...................... | 375/343 |
| 6,643,336 B1 | 11/2003 | Hsieh et al. | ................ | 375/343 |

(Continued)

FOREIGN PATENT DOCUMENTS

EP   823804 A2   11/1998

(Continued)

OTHER PUBLICATIONS

Nogami et al., "A Frequency and Timing Period Acquisition Technique for OFDM Systems", 1995, IEEE.

(Continued)

*Primary Examiner*—Khai Tran
(74) *Attorney, Agent, or Firm*—Dov Rosenfeld; Inventek

(57) ABSTRACT

The repetitive structure of a preamble signal is exploited to enhance timing synchronization performance and frame start detection performance under adverse channel conditions. Received values are cross-correlated in time against a known noise-free version of the preamble. The presence of peaks in the cross-correlation output indicates presence of a frame. The peak locations provide symbol timing. Further cross-correlation processing and/or non-linear processing can be used to enhance the signal to noise ratio of the peaks.

12 Claims, 6 Drawing Sheets

U.S. PATENT DOCUMENTS 6,874,096 B1     3/2005  Norrell et al. .............. 713/400

FOREIGN PATENT DOCUMENTS

JP            7030513       1/1995

OTHER PUBLICATIONS

Schmidl et al., "Low-Overhead Low-Complexity [Burst] Synchronization for OFDM", Stanford University, 1996.

Sandell et al., "Timing and Frequency Synchronization in OFDM Systems Using the Cyclic Prefix", Luleå University of Technology Sweden. 1995.

"Part 11: Wireless LAN Medium Access Control (MAC) and Physical Layer (PHY) Specifications, High-Speed Physical Layer in the 5 GHz Band", IEEE Std. 802.11A-1999.

* cited by examiner

PREAMBLE AIDED SYNCHRONIZATION

RELATED PATENT APPLICATIONS

The present application is a continuation of U.S. patent application Ser. No. 10/039,117 filed on Nov. 20, 2001 now U.S. Pat. No. 7,006,587 titled PREAMBLE AIDED SYNCHRONIZATION. The contents of U.S. patent application Ser. No. 10/039,117 are incorporated herein by reference.

BACKGROUND OF THE INVENTION

The present invention relates to reception of digital signals and more particularly to systems and methods for synchronization.

To successfully recover data from a received signal, it is necessary for the receiver to detect the presence of the received signal and it is often necessary for the receiver to estimate values for various parameters of the received signal that cannot be precisely known in advance. Such parameters may include, e.g., the received amplitude of the signal, the carrier frequency of the signal, response characteristics of a communication channel used to transport the signal, the timing of transitions between successive symbols or bits encoded onto the signal, etc. In many situations, reliable data recovery is impossible without accurate estimation of one or more of these parameters.

To allow the receiver to determine such parameters and detect signal presence, many data communication schemes provide for a so-called preamble to be transmitted prior to any data. The preamble contents and structure are chosen to facilitate detection of the beginning of the frame and receiver estimation of characteristics such as frequency, timing, amplitude, etc. The present discussion will focus on detection of the frame start and establishment of timing synchronization.

In many communication systems, the preamble consists of repetitive groups of symbols, usually called short symbols. The short symbols may be as simple as alternating ones and zeros or as complex as short pseudorandom sequences. The presence of the short symbols is typically determined by simple detection of the received energy. Symbol synchronization is then determined by using inter-symbol transitions to derive a symbol clock by employing a phase-lock oscillator. This approach works well for high signal to noise ratio systems but performs poorly for weak signals such as are often found in wireless communication systems.

It is desirable to reliably detect the short symbols as early as possible with maximum reliability, even under conditions of noise, interference, and/or channel-induced distortion, in order to aid subsequent receiver functions, such as setting automatic gain control, estimating channel characteristics, and deriving carrier/symbol synchronization. It is also desirable to establish accurate and reliable timing synchronization under these conditions.

SUMMARY OF THE INVENTION

In accordance with one embodiment of the present invention, the repetitive structure of a preamble signal is exploited to enhance timing synchronization performance and frame start detection performance under adverse channel conditions. Received values are cross-correlated in time against a known noise-free version of the preamble. The presence of peaks in the cross-correlation output indicates presence of a frame. The peak locations provide symbol timing. Further cross-correlation processing and/or non-linear processing can be used to enhance the signal to noise ratio of the peaks.

According to a first aspect of the present invention a method for detecting start of a frame includes: processing a received signal with a known preamble to obtain cross-correlation information for the received signal and the known preamble, searching for an indication of strong-cross correlation between the received signal and the preamble using the cross-correlation information, and registering start of the frame based on the indication.

According to a second aspect of the present invention, apparatus for synchronizing to a frame includes: a cross-correlation system that processes a received signal with a known preamble to obtain cross-correlation information for the received signal and the known preamble and a synchronization information generation block that searches for an indication of strong cross-correlation between the received signal and the preamble using the cross-correlation information and that provides a synchronization signal responsive to this indication.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative communication system, more particularly, a wireless communication system based on the IEEE 802.11a standard as described in IEEE Std 802.11a-1999, Supplement to IEEE Standard for Information Technology Telecommunications and Information Exchange between Systems-Local and Metropolitan Area Networks-Specifics Requirements, Part 11: Wireless LAN Medium Access Control (MAC) and Physical Layer (PHY) specifications High-Speed Physical Layer in the 5 GHz Band, IEEE Standard Association 1999, the contents of which are incorporated herein by reference in their entirety for all purposes.

The present invention is, however, not limited to this application. For example, the present invention may be applied to any type of communication system including other wireless communication systems, wired communication systems such as cable modems, DSL modems, dial-up modems, etc. The present invention is also not restricted to communication systems but may be applied to other systems involving the recovery of data from a received signal such as data storage systems, navigational systems, radio imaging systems, etc.

Figure 2:
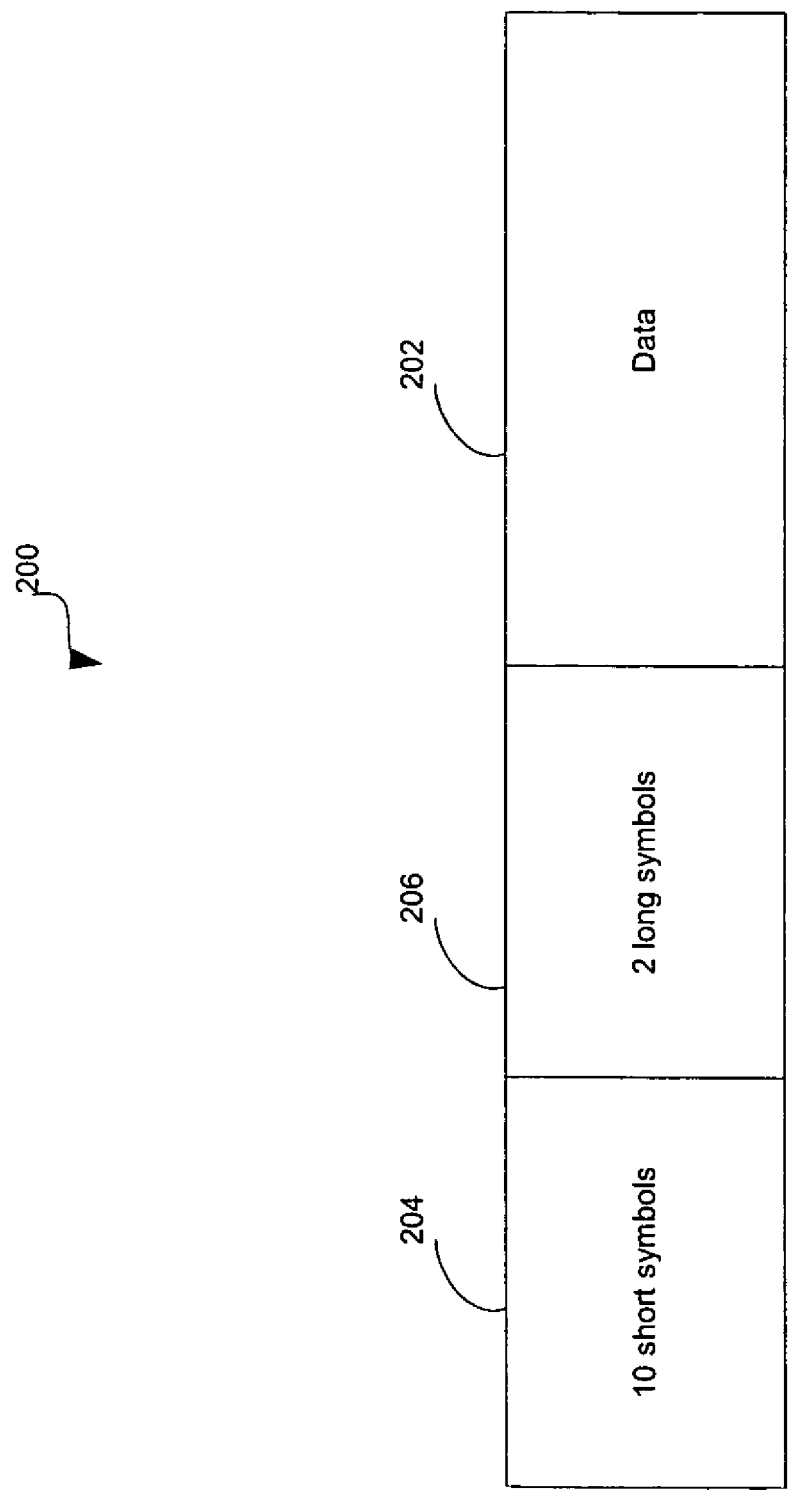
FIG. 2 depicts elements of a representative frame structure.

FIG. 2 depicts a simplified representation of an 802.11a frame 200. It will be understood that the term "frame" generally refers to any received signal having a defined beginning. A data field 202 includes a sequence of data symbols. Data field 202 begins with information specifying details of the currently used modulation constellation as well as information indicating the length of data transmitted by the frame.

Prior to data field 202, frame 200 begins with 10 so-called "short symbols" in a short symbol field 204. The standard specifies that the first seven short symbols are to be used for signal detection, automatic gain control, and selection among multiple antennas using diversity reception techniques. The remaining three short symbols are allocated for use for course frequency offset estimation and timing synchronization. A long symbol field 206 includes two long symbols. The long symbols are allocated for use in fine frequency offset estimation as well as evaluation of the channel response to facilitate equalization. Guard intervals are not shown.

Although the 802.11a standard specifies the last three short symbols to be for use in timing synchronization and the first seven short symbols to be for use in signal detection, the present invention more generally focuses on all ten short symbols for use in signal detection and timing synchronization in one embodiment. Each of the ten short symbols occupies 0.8 microseconds in time. Each short symbol is an OFDM burst consisting of twelve sub-carriers modulated by elements of a sequence specified by the 802.11a standard. A time domain representation of the ten short symbols taken as a whole is given as a 160 sample vector whose contents are specified in the standards document referenced above in Table G.4 at pp. 58-59.

Figure 1:
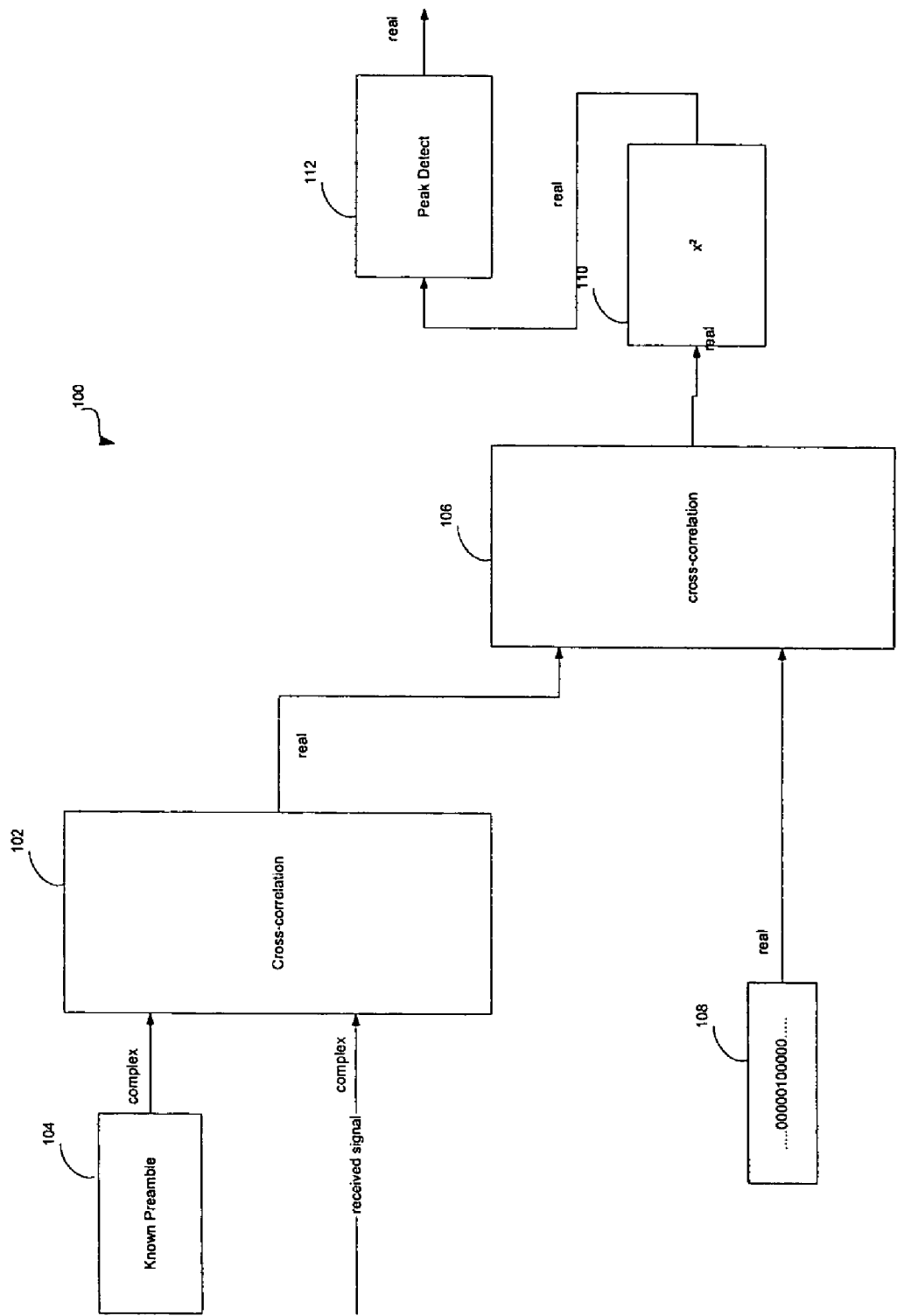
FIG. 1 depicts a synchronization and frame start detection system according to one embodiment of the present invention.

Instead of using phase lock techniques in conjunction with energy detection, one embodiment of the present invention correlates received samples to the time domain sample vector shown in table G.4. FIG. 1 depicts a synchronization and frame start detection system 100 according to one embodiment of the present invention. A cross-correlation block 102 cross-correlates two inputs. One input provides sequential time domain samples from a stored known preamble 104. The contents of known preamble 104 correspond to the time domain sample vector of Table G.4. This is cross-correlated with a received signal which has been recovered from a carrier, down-converted to baseband, and sampled at the same sampling rated assumed by the contents of known preamble 104.

Figure 4A:
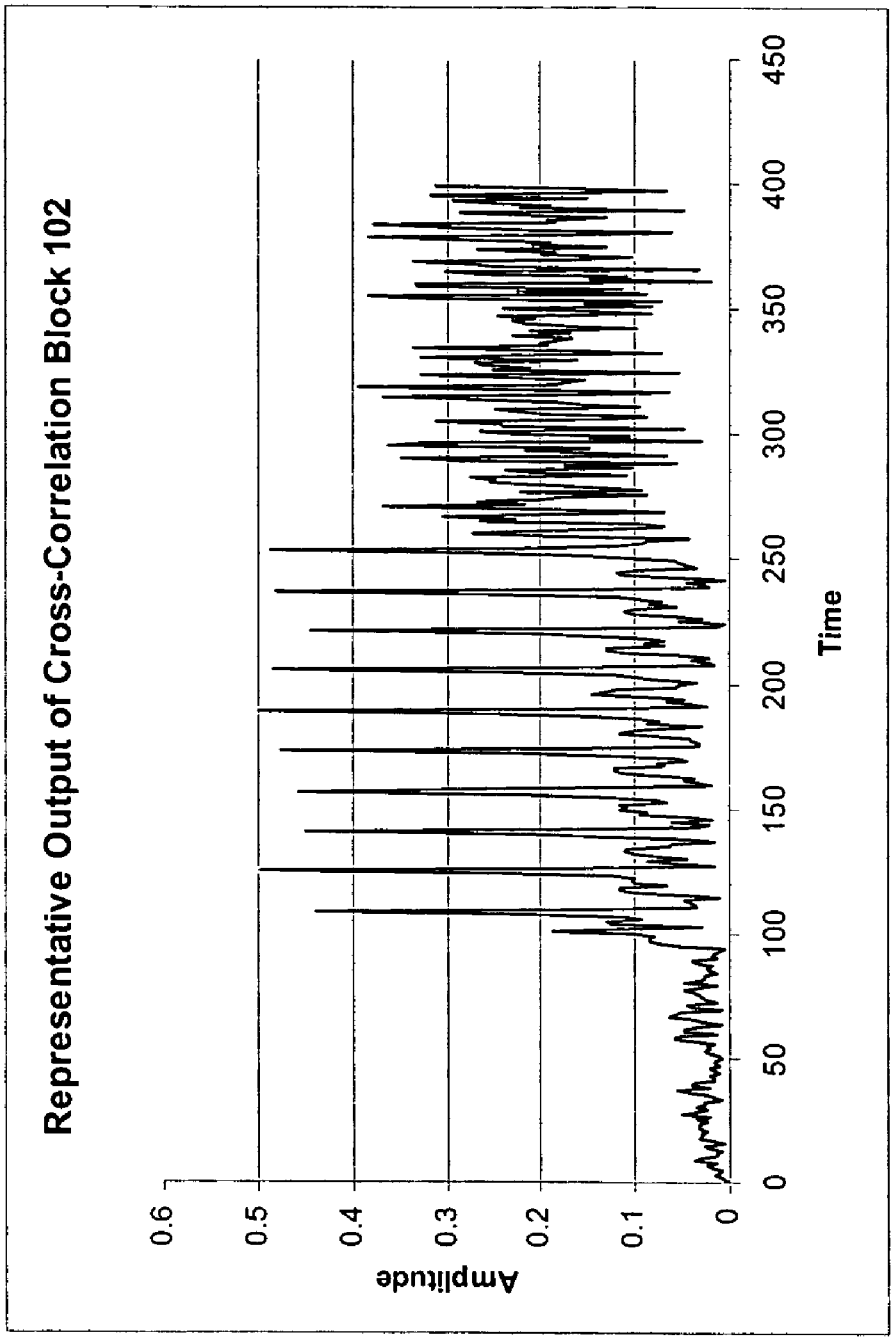
FIGS. 4A-4C depict signals generated in accordance with one embodiment of the present invention.

The carrier frequency assumed for carrier recovery is based on a priori knowledge of carrier frequency rather than precise synchronization. Cross correlation block 102 applies the expression $$y(m) = \frac{1}{M} \sum_{n=0}^{M-1} x(n)x(n+m)$$

to cross-correlate the known preamble and the received samples where M is the number of samples per short symbol. The inputs and outputs of block 102 have complex values. When the short symbols are currently being received, the output of cross-correlation block 102 will be a sequence of periodic impulses superimposed on a cross-correlation noise floor as shown in FIG. 4A. The magnitudes of these pulses are a function of the length of the short symbol sequence. The pulse widths reflect channel distortions.

As can be seen in FIG. 4A, under noisy channel conditions, the pulses may not rise very far from the cross-correlation noise floor. Although it would be possible in certain situations to accurately detect start of frame and recover timing synchronization based on the signal shown in FIG. 4A, further signal processing is provided in one embodiment to enhance performance.

A further cross-correlation block 106 cross-correlates of cross-correlation block 102 with a reference template 108. There are N*M samples in template 108 where M is the number of samples per short symbol and N is a repetition factor that is greater than or equal to one and preferably no larger than number of short symbols in the preamble. Each repetition of the reference template consists of a sequence of M real values consisting of a single "1" followed by M−1 zeroes. The processing performed by cross-correlation block 106 may also be characterized as a type of lowpass filter. The output of cross-correlation block 106 has a much higher signal to correlation noise ratio than the input, by a factor of 10 logM.

Figure 4B:
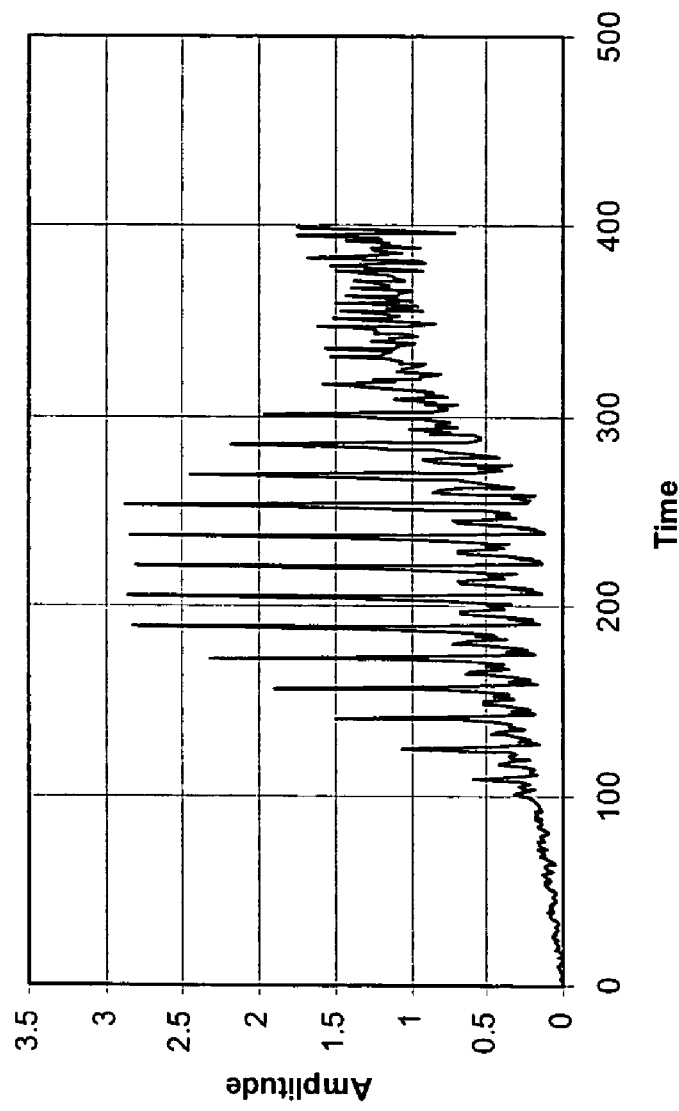

Non-linear processing provides a further improvement in the ability to detect the peaks. In one embodiment, a non-linear processing block 110 squares the magnitude of the complex output of cross-correlation block 106. Any other suitable non-linear function may be used, e.g., a cubing function. FIG. 4B shows representative output of non-linear processing block 110. Non-linear processing block 110 provides narrow peaks that are high above the noise floor and easily detected.

Figure 4C:
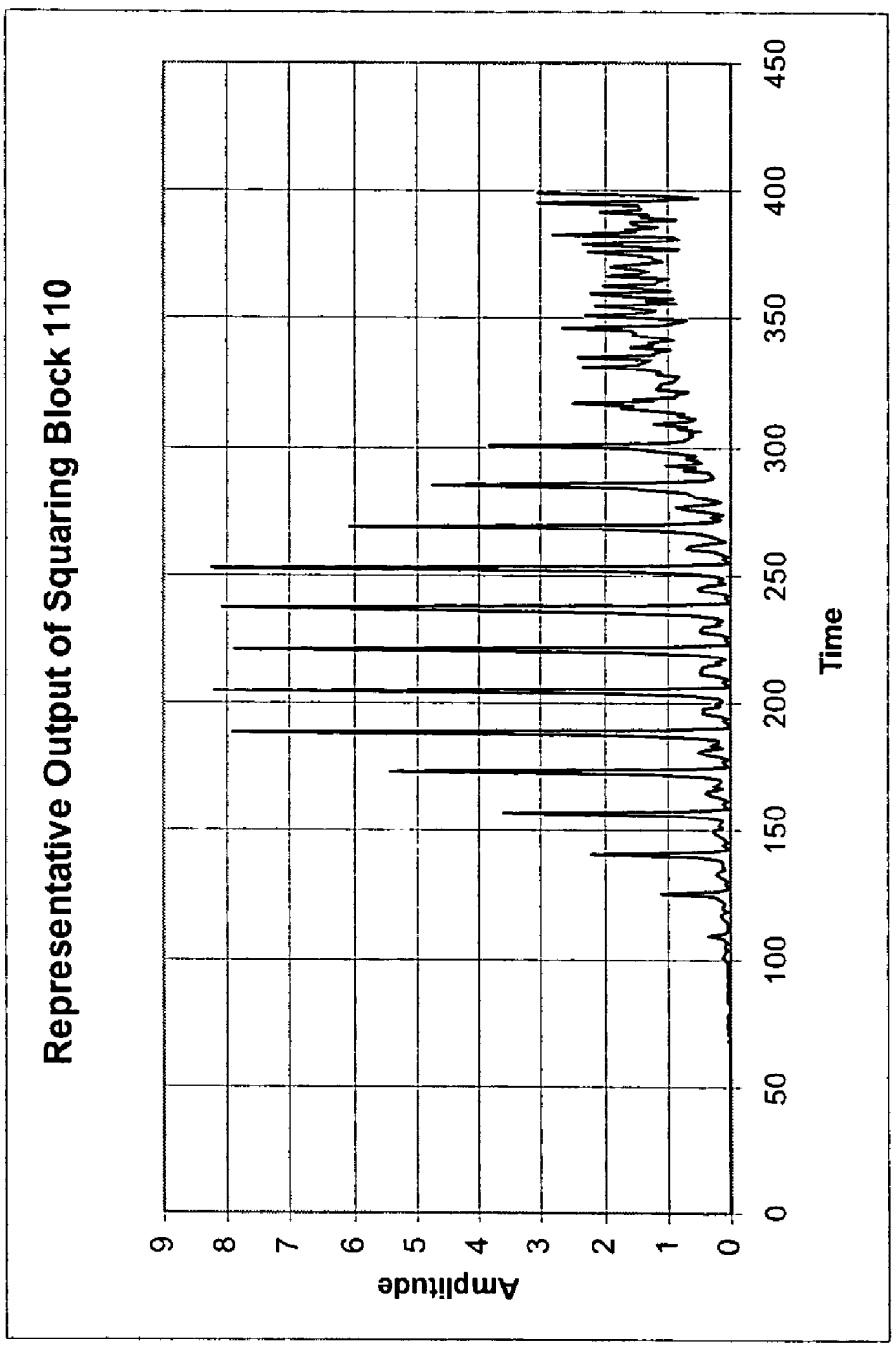

A peak detection block 112 detects the presence of peaks and provides the output shown in FIG. 4C. The peak locations indicate inter-symbol transition timing such that the output of peak detection block 112 may be used as a symbol synchronization signal. Also, receipt of a predetermined number of peaks, e.g., 2 or 3, in sequence at approximately the expected spacing indicates the beginning of a frame.

Figure 3:
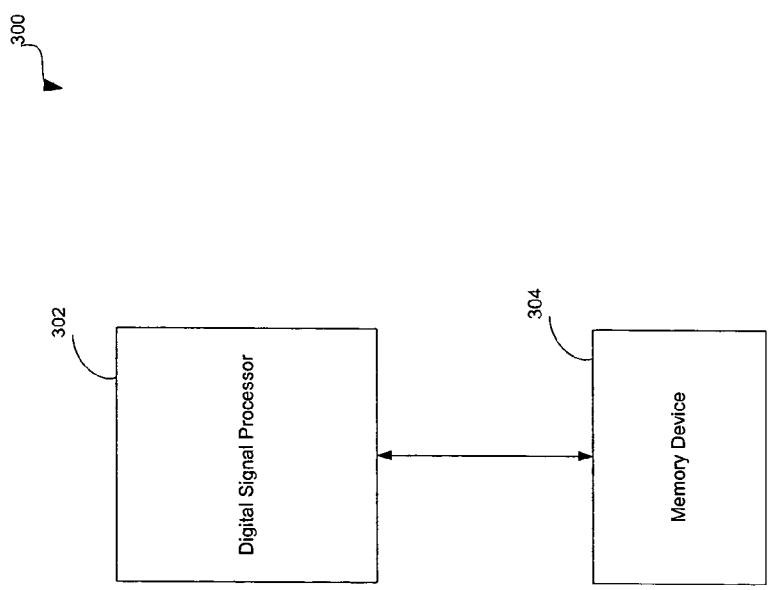
FIG. 3 depicts representative hardware suitable for implementing one embodiment of the present invention.

FIG. 3 depicts a representative system 300 that may be used to implement the present invention. A digital signal processor 302 is capable of executing conventional mathematical floating point operations as well as specialized operations such as cross-correlation. The operation of digital signal processor 302 is controlled by software stored in a memory device 304. The memory device 304 may be e.g., a read only memory (ROM), a random access memory (RAM), etc. Memory device 304 may be implemented in any suitable manner.

Memory 304 is but one example of a computer-readable storage medium that stores instructions for execution by a processor such as processor 302. For example, instructions for implementing processing according to the present invention may be stored on a floppy disk, CD-ROM, DVD-ROM, or any computer-readable storage medium. Another example of obtaining instructions from a computer-readable storage medium is loading the instructions from a network.

Memory and processing may be, e.g., integrated on one device or divided among many devices. Digital processing according to the present invention may also be implemented by e.g., a general-purpose microprocessor, a field programmable gate array (FPGA), an application specific integrated circuit (ASIC), etc.

It will be seen that the present invention provides a great improvement in the ability to detect start of frame and to synchronize to received symbol timing in the presence of noise and other corruption. Furthermore, the described system does not suffer from receiver clipping that occurs in the presence of strong signals before the automatic gain control loop has a chance to adjust gain in response, thereby enabling earlier detection of a frame. Thus, the described system is ideal to use in, e.g., any communication system that employs frames in an environment having high noise, interference, and/or channel distortion.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the preamble may have any suitable content. Also, processing according to the present invention may be performed all or in part using analog techniques rather than the disclosed digital techniques.

The invention claimed is:

1. A method for detecting start of a frame, said method comprising:
   processing a received signal with a known preamble to obtain cross-correlation information for said received signal and said known preamble, wherein said known preamble includes a repetition of a particular symbol to includes a plurality of the particular symbol, and wherein said processing to obtain the cross-correlation information includes applying a first cross-correlation operation and a second cross-correlation operation;
   searching for an indication of strong cross-correlation between said received signal and said preamble using said cross-correlation information obtained from the first cross-correlation operation and the second cross-correlation operation; and
   registering start of said frame upon detection of said indication.

2. A method as recited in claim 1, wherein processing said received signal comprises:
   cross-correlating said received signal with at least part of said known preamble using said first cross-correlation operation to develop a cross-correlation signal, and cross-correlating said cross-correlation signal with a signal representing a plurality of impulses using said second cross-correlation operation to determine the cross-correlation information.

3. A method as recited in claim 2, wherein using said second cross-correlation operation comprises:
   filtering said cross-correlation signal.

4. Apparatus for synchronizing to a frame, said apparatus comprising:
   a cross-correlation system that processes a received signal with a known preamble to obtain cross-correlation information for said received signal and said known preamble, wherein said known preamble includes a repetition of a particular symbol to include a plurality of the particular symbols, and wherein the cross-correlation system includes a first cross-correlator and a second cross-correlator; and
   a synchronization signal generation block that searches for an indication of strong cross-correlation between said received signal and said preamble using said cross-correlation information and provides a synchronization signal responsive to said indication.

5. An apparatus as recited in claim 4, wherein said first cross-correlator of said cross-correlation system cross-correlates said received signal with at least part of said known preamble to develop a cross-correlation signal, and wherein said second cross-correlator cross-correlates said cross-correlation signal with a signal representing a plurality of impulses to determine the cross-correlation information.

6. An apparatus as recited in claim 5, wherein said second cross-correlator correlator comprises a filter that filters said cross-correlation signal.

7. A computer-readable storage medium that stores code detecting start of a frame, the computer-readable storage medium comprising:
   code that processes a received signal with a known preamble to obtain cross-correlation information for said received signal and said known preamble, wherein said known preamble includes a repetition of a particular symbol to includes a plurality of the symbols, and wherein said processing to obtain the cross-correlation information includes applying a first cross-correlation operation and a second cross-correlation operation;
   code that searches for an indication for a strong cross-correlation between said received signal and said preamble using said cross-correlation information obtained from the first cross-correlation operation and the second cross-correlation operation; and
   code that registers start said frame upon detection of said indication.

8. A computer-readable storage medium as recited in claim 7, wherein said code that processes said received signal includes:
   code that cross-correlates said received signal with at least part of said known preamble using said first cross-correlation operation to develop a cross-correlation signal, and code that cross-correlates said cross-correlation signal with a signal representing a plurality of impulses using said second cross-correlation operation to determine the cross-correlation information.

9. The medium of claim 8 wherein said code that cross-correlates said cross-correlation signal includes:
   code that filters said cross-correlation signal.

10. A computer-readable storage medium for synchronizing to a frame, said computer-readable storage medium comprising:
    code that cross-correlates a received signal with a known preamble to obtain cross-correlation information for said received signal and said known preamble, wherein said known preamble includes a repetition of a particular symbol to includes a plurality of the symbols, said code that cross-correlates including code that implements a first cross-correlation operation and code that implements a second cross-correlation operation; and
    code that searches for an indication for a strong cross-correlation between said received signal and said preamble using said cross-correlation information and provides a synchronization signal responsive to said indication.

11. A computer-readable storage medium as recited in claim 10, wherein said code that cross-correlates comprises code that cross-correlates said received signal with at least part of said known preamble to develop a cross-correlation signal, and code that cross-correlates said cross-correlation signal with a signal representing a plurality of impulses using said second cross-correlation operation to determine the cross-correlation information.

12. A computer-readable storage medium as recited in claim 11, wherein said code that cross-correlates comprises code that filters said cross-correlation signal.

* * * * *